Patented Jan. 9, 1951

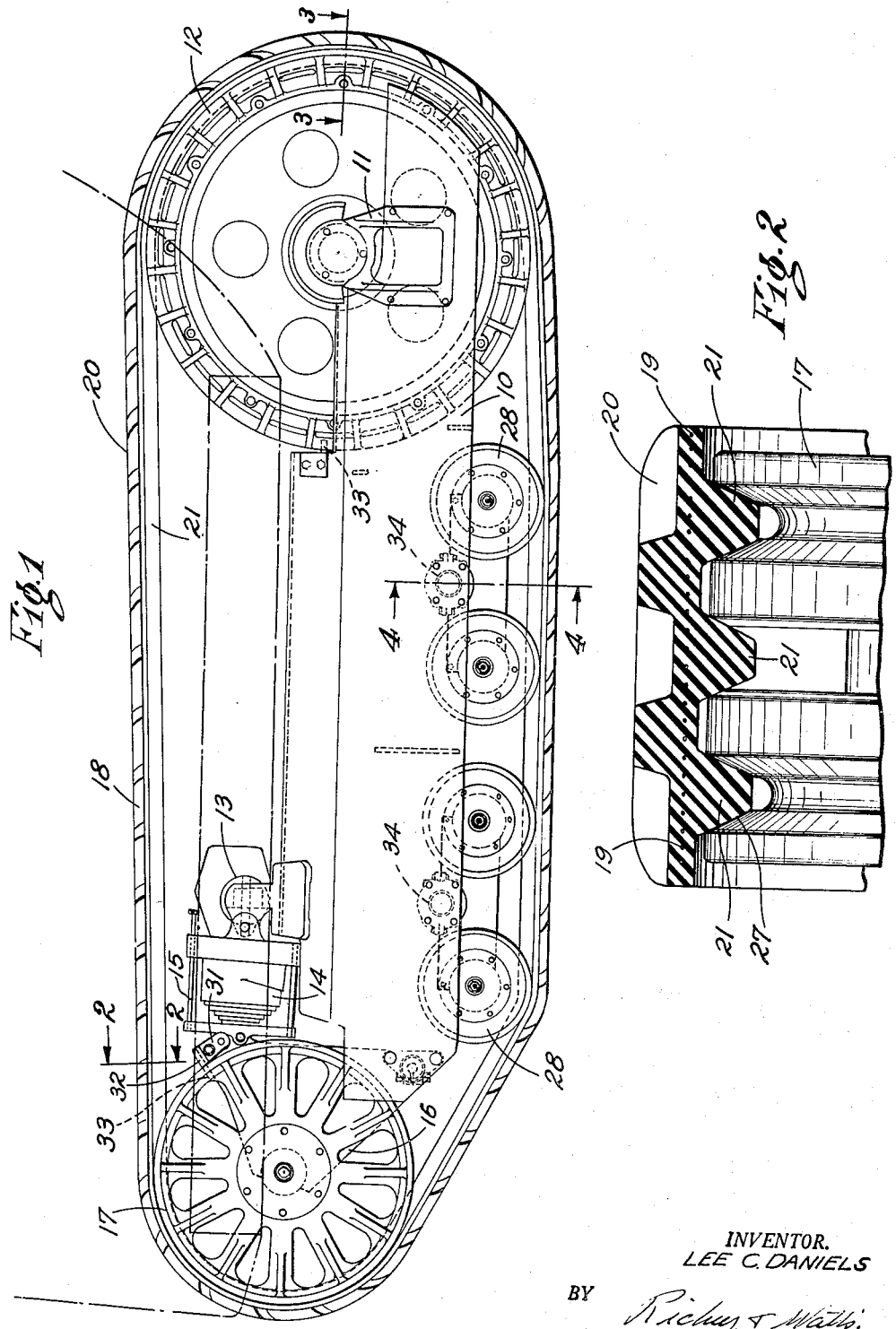

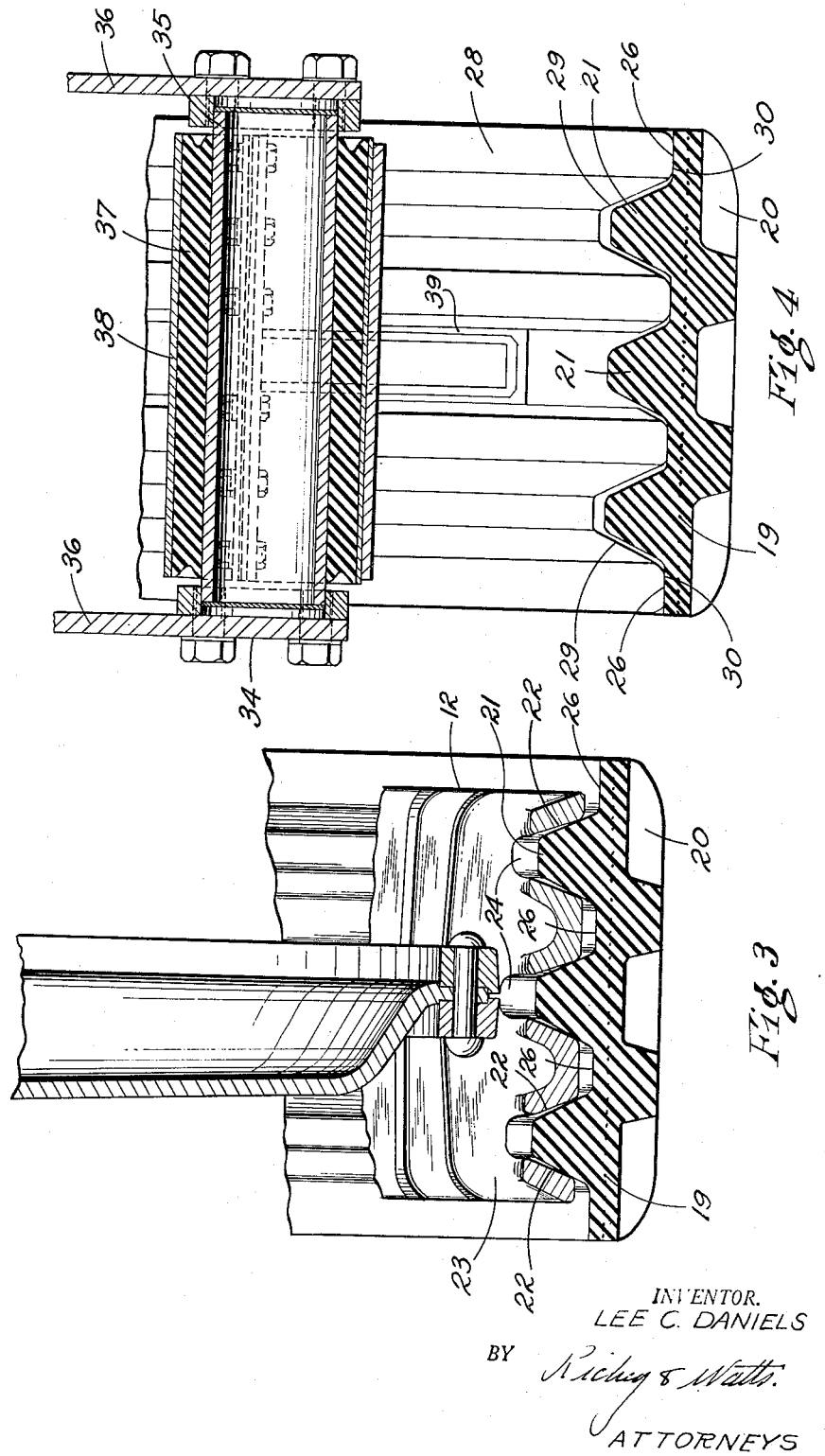

2,537,745

UNITED STATES PATENT OFFICE 2,537,745

TRACK AND SUPPORTING MECHANISM FOR CRAWLER TYPE TRACTORS

Lee C. Daniels, East Cleveland, Ohio, assignor, by mesne assignments, to The Oliver Corporation, Chicago, Ill., a corporation of Delaware Application August 23, 1944, Serial No. 550,774

7 Claims. (Cl. 305—8)

1

This invention relates broadly to crawler tractors and more specifically to improvements in the track and track supporting structure therefor.

The primary object of the invention is to provide a track which may be used with efficacious and economic results in the environs within which crawler tractors are customarily employed and in addition a track which may be driven over paved highways and other finished areas without injury to the surface thereof.

To this end the invention contemplates generally an endless belt formed of rubber or a similar flexible material having homogeneous tread cleats on the outer face thereof and longitudinal ribs of V-belt section, constituting driving and guiding elements on the inner face of the belt.

A further object of the invention resides in the provision of sheave wheels machined for driving engagement with the V-belt sections of the track, idler pulleys machined in complemental configuration with the V-belt sections and bogie wheels or rollers formed for engagement with the plane surfaces of the track belt and running clearance with the side walls and crests of the V-belt sections.

Another object of the invention is to provide an elastic torsion bearing for the bogie structure, the size and yieldable characteristics of the bearing being designed to prevent excessive tension in localized areas of the track during operation of the vehicle over sharp proturberances or severe undulations of the ground.

Another object of the invention is to provide a track which will facilitate high speed operation of the vehicle on highways or similar environs, without injury to the track or injury to the vehicle as obtained through the deleterious vibratory reactions inherent in tracks of the metal link type.

Further objects of the invention reside in the provision of a track belt and supporting structure which is economic of manufacture, durable of structure, efficient in operation and susceptible of ready attachment or removal for purpose of renewal or repair.

Other objects and advantages more or less ancillary to the foregoing and the manner in which all the various objects are realized will appear in the following description, which considered in connection with the accompanying drawings, set forth the preferred embodiment of the invention.

In the drawings in which the preferred embodiment of the invention is illustrated:

2

Fig. 1 is a partial side elevation of a tractor frame assembly illustrating the form and arrangement of the improved track and supporting structure therefor;

Fig. 2 is a vertical section through the track and drive sheave, the section being taken on a plane indicated by the line 2—2 in Fig. 1;

Fig. 3 is a transverse section through the drive pulley and track, the section being taken on the plane indicated by the line 3—3 in Fig. 1; and Fig. 4 is a vertical sectional view through the bogie carriage and track, the section being taken on the plane indicated by the line 4—4 in Fig. 1.

Referring first to Fig. 1, the tractor frame assembly comprises side plates 10 of the form generally employed in track laying vehicles of this character, journal bearings 11 mounted thereon for the support of a drive sheave 12 and trunnion bearings 13 for the retention of the idler wheel tensioning mechanism. The trunnions 13 are constructed for the support of volute springs 14 mounted in guide frames 15 which are coupled in turn with pivotally supported arms 16 having idler pulleys 17 mounted on the end therefor for the tensive support of the track belt 18. The supporting structure for the idler pulley is of the general form customarily employed in crawler type tractors. Hence, since the specific construction of the assembly forms no part of the present invention further description thereof is deemed unnecessary herein.

The track 18 comprises a homogeneous, continuous belt formed of rubber or a similar flexible material reinforced with non-extensible metal cables 19 embedded in the body thereof and preferably disposed in a common plane in spaced relation with each other. The track is moulded or otherwise formed with rubber lugs or tread cleats 20 of rubber or a similar flexible material formed on the outer face thereof while the inner face of the track is formed with a plurality of parallel longitudinal ribs 21 having inclined side walls of the general configuration of a V-belt. As illustrated in Fig. 3, the drive sheave 12 is formed with grooves 22 in the face thereof, disposed in spaced relation for the reception of the ribs 21. The side walls of the grooves are formed with interfering angles relative to the inclined side walls of the ribs, i. e. the grooves converge inwardly, the included angle thereof being more acute than that the included angle of the ribs 21 in the track so that the ribs may be wedged therein for driving engagement during rotation of the sheave. In order to provide an effective drive, the belt and the ribs are formed with as many ribs and grooves of uniform cross section as may be divided equally into the face of the sheave. The walls defining the grooves in the sheave wheels terminate adjacent the crests of the ribs 21 in the track, the flanged sides and transverse webs 23 in the sheave being formed with intercommunicating openings 24 which are provided to facilitate the discharge of such foreign matter as may accumulate upon the inner face of the track. The portions of the sheave intermediate the grooves 22 are formed for clearance over the inner face 26 of the track so that frictional side wall engagement may be maintained during driving deformation of the track ribs and the life of the belt prolonged as wear occurs.

The idler pulley 17 (Fig. 2) is formed with grooves 27 therein which are of complemental configuration to the ribs 21 of the track or belt 18, clearance being provided in the bottoms of the grooves and at the crest of the portions of the pulley adjacent the grooves. The bogie wheels or rollers 28 (Fig. 4) are formed with grooves 29 in the face thereof which are of complemental configuration to the ribs 21 but formed for side wall clearance therewith. The grooves 29 in the bogie wheels are formed for clearance with the crests of the ribs 21 and the circumferential faces 30 of the wheels are designed for engagement with the inner face 26 of the track so that the load of the vehicle will be borne thereon and the driving mechanism relieved from the drag inherent in the V-structure.

As shown in Fig. 1, the guide frame 15 is provided with an apertured lug 31 having an arm 32 mounted thereon for the support of a blade 33 formed in configuration with the profile of the idler pulley to scrape mud or other foreign matter from the grooves and face thereof. The drive sheave may also be provided with a scraper blade 33 mounted in any suitable manner on the frame 10.

As will be seen in Figs. 1 and 4, the pivotal mounting 34 for the bogie carriage comprises a spindle 35 supported against rotation at opposed ends thereof in the frame members 36. The periphery of the spindle 35 is provided with a resilient bushing 37 vulcanized or otherwise secured thereto, the outer face of the bushing being also secured against rotation to a sleeve 38 having an arm 39 attached thereto which is anchored upon the frame 10. As the track is brought into contact with sharp road protuberances, deflection thereof is attained through the compound movement of the spring pressed idler pulley 17 and the roller 28 contiguous such protuberances, restraint against shock or undue movement of the latter being effected through the action of the torsion bushings 37 and the consequent damped oscillation of the bogie carriage.

From the foregoing it will be readily recognized that the resilient belt or track 18 may be driven from the drive sheave 12 in a manner similar to that of the chain and sprocket mechanism heretofore employed, that the forward end of the track will be guided over the pulley 17 without undue frictional losses and that the road engaging surface of the track will be adequately supported by the cylindrical faces of the bogie wheels and the resilient mounting therefor. It will be further seen that a track of this character may be operated on paved roads or similar areas without injury to the surface thereof or injury to the vehicle when operated at relatively high speeds.

In wheel type tractors the maximum road engagement of the driving wheels is approximately 14 square inches. In the track embodying the rubber surface engaging the road is approximately 400 square inches. Thus it will be seen that the improved track not only affords a greater traction but also presents a surface contact which tends to roll down road projections or protuberances while the point contact of a wheel tends to pound ruts, holes or depressions in the surface thereof particularly when the pavement is worn or the soil is soft or of an infirm character.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A track assembly for a crawler tractor, comprising an endless rubber belt, longitudinal ribs of V-belt section on the inner face thereof, a drive pulley therefor having grooves therein formed for frictional driving engagement with the side walls of said ribs, an idler pulley for said belt disposed in spaced relation with the drive pulley, said idler pulley having grooves therein of complemental configuration and non-driving engagement with said ribs and bogie wheels for the support of the portion of said belt intermediate the driving and idler pulleys, said wheels having grooves therein formed for clearance with the side walls of said ribs and having the circumferential faces thereof engaged with the portions of the belt adjacent said ribs whereby power losses are minimized consequent the non-driving engagement of the belt with the idler pulley and bogie wheels when the belt is drawn by the drive pulley.

2. A track assembly for a crawler tractor comprising an endless rubber belt, longitudinal ribs having inclined side walls on the inner face thereof, a drive sheave having grooves therein with inclined side walls, the grooves of said drive sheave having inwardly converging side walls in which the included angles are more acute than the included angles between the walls of said ribs, an idler pulley for the support of the belt having grooves therein of complemental configuration to the side walls of the ribs and bogie wheels for the support of the belt having grooves therein formed for free running contact with the side walls of said ribs whereby said belt is driven by said drive pulley and merely guided by said idler pulley and bogie wheels.

3. A track assembly for a crawler type vehicle comprising an endless rubber belt, longitudinal continuous ribs on the inner face thereof, a drive sheave having grooves therein formed for frictional driving engagement with the side walls of said ribs, the grooves of said drive sheave having inwardly converging side walls in which the included angles are more acute than the included angles between the walls of said ribs, said belt and sheave being formed with as many ribs and grooves of uniform cross section as may be divided equally into the face of the sheave, and idler pulleys and bogie wheels for the support of the belt having grooves therein formed for the running engagement with the side walls of said ribs.

4. In a track laying tractor embodying a grooved drive sheave, a grooved idler pulley and grooved bogie wheels, a track therefor comprising an endless non-metallic belt formed of flexible material, ribs on the inner face of said track engagable with the grooves in said drive sheave idler pulley and bogie wheels, the engaging walls on the inner face of said rib being in planes out of parallel with the planes of the side walls of the grooves in said drive sheave and in free running engagement with the side walls of said idler pulley and bogie wheels.

5. A track assembly for a crawler type tractor comprising an endless rubber belt, continuous longitudinal ribs of V-belt section on the inner face thereof, a drive sheave for the support of said belt having grooves therein formed for frictional engagement with said ribs, said drive sheave having unobstructed openings in the wall defining the base of said groove to facilitate the discharge of such foreign matter as may accumulate upon the ribs of the belt and a grooved idler pulley and bogie wheels disposed in spaced relation with said drive sheave and formed for free running engagement with said ribs whereby said belt is operatively supported by the idler pulley and bogie wheels and driven by said drive sheave.

6. In a combination with a tractor embodying a chassis frame, a drive pulley mounted thereon, an idler pulley on said frame disposed in spaced relation therewith and bogie wheels on said frame intermediate said drive and idler pulleys, said pulleys and bogie wheels having grooves with tapered side walls formed in the circumferential faces thereof, a continuous homogeneous flexible belt mounted on said pulleys, continuous longitudinal ribs having tapered side walls on the inner face of said belt, the tapered sides of the grooves in the idler pulley and bogie wheels being formed for free running engagement with tapered side walls of said ribs and the grooves in the drive pulley being formed with interfering side walls in which the included angles are more acute than the angle formed by the tapered side walls of said ribs.

7. In a vehicle of the type including a driven endless non form-sustaining track, the combination with a power driven wheel of the single disc type and peripherally provided with a plurality of spaced rib receiving annular channels defined by inwardly converging side wall surfaces terminating, at least over a major portion of the wheel circumference, short of their projected point of intersection to provide a communicating channel through the peripheral structure of the wheel, said channel leading inwardly into unhoused space laterally of the wheel disc to permit material passing through such aperture freely to be ejected from said wheel structure; of an endless track of pliable material and including an outwardly directed ground contacting surface and an inwardly directed wheel engaging surface comprising multiple spaced ribs disposed longitudinally of said track, said ribs defining, in cross section, the configuration of a truncated V and spaced for complemental reception within the peripheral channels of said wheel, said ribs being of a transverse dimension at the base thereof greater than the transverse dimension of the convergent peripheral channels of the wheel at the outermost position of the latter, whereby the surface of said track throughout the area intermediate said inwardly directed ribs is retained in spaced relation to the surface of that portion of the wheel intermediate the peripheral channels with the track completely engaging the channel walls as an aid to the ejection of material drawn into the peripheral channels by said track ultimately to be forced along said ribs and through said peripheral channels to drop through said apertures ultimately to be ejected from said wheel structure.

LEE C. DANIELS.

REFERENCES CITED

The following references are of record in the file of this patent:

UNITED STATES PATENTS

| Number | Name | Date |
|---|---|---|
| 1,397,314 | Cox | Nov. 15, 1921 |
| 1,487,340 | Kroupsky | Mar. 18, 1924 |
| 1,542,149 | Landry | June 16, 1925 |
| 1,820,882 | Engstrom | Aug. 25, 1931 |
| 2,050,845 | Jett | Aug. 11, 1936 |
| 2,067,400 | Koplin et al. | Jan. 12, 1937 |

FOREIGN PATENTS

| Number | Country | Date |
|---|---|---|
| 134,190 | Great Britain | Nov. 13, 1919 |